US008902713B2

(12) United States Patent
Alameh et al.

(10) Patent No.: US 8,902,713 B2
(45) Date of Patent: Dec. 2, 2014

(54) WEARABLE DEVICE WITH ACOUSTIC USER INPUT AND METHOD FOR SAME

(75) Inventors: Rachid M. Alameh, Crystal Lake, IL (US); Paul R. Steuer, Hawthorn Woods, IL (US); Robert A. Zurek, Antioch, IL (US)

(73) Assignee: Motorola Mobility LLC, Libertyville, IL (US)

( * ) Notice: Subject to any disclaimer, the term of this patent is extended or adjusted under 35 U.S.C. 154(b) by 336 days.

(21) Appl. No.: 13/597,643

(22) Filed: Aug. 29, 2012

(65) Prior Publication Data

US 2014/0064037 A1    Mar. 6, 2014

(51) Int. Cl.
*G10K 11/00* (2006.01)

(52) U.S. Cl.
USPC .............................. 367/199; 341/22; 601/150

(58) Field of Classification Search
CPC ........... G04G 21/08; G10K 11/00; H03J 9/04; G08C 19/12; G08C 19/14; G08C 23/02; G08C 19/28
USPC ......... 367/199; 341/20, 22; 601/151, 150, 46; 704/277, E15.04, E17.002
See application file for complete search history.

(56) References Cited

U.S. PATENT DOCUMENTS

| 6,982,930 | B1 | 1/2006 | Hung | |
|---|---|---|---|---|
| 7,146,667 | B2 | 12/2006 | Elsener | |
| D646,191 | S | 10/2011 | Murphy | |
| 8,273,039 | B1 * | 9/2012 | Ignagni | 601/151 |
| 2003/0212335 | A1 * | 11/2003 | Huang | 600/500 |
| 2008/0068224 | A1 * | 3/2008 | Holland | 341/20 |
| 2008/0103781 | A1 * | 5/2008 | Wasson et al. | 704/277 |
| 2009/0241753 | A1 | 10/2009 | Mann et al. | |
| 2011/0155765 | A1 | 6/2011 | Properzi | |
| 2011/0175813 | A1 | 7/2011 | Sarwar et al. | |

\* cited by examiner

*Primary Examiner* — Omer S Khan
(74) *Attorney, Agent, or Firm* — Leydig, Voit & Mayer, Ltd.

(57) ABSTRACT

An electronic device (100) includes a component portion (101) and a strap (102). The strap defines an air chamber (402) therein having a corresponding volume. A driver (403) is disposed in the component portion at a first port (404) between the component portion and the strap. A frequency detector (405) is disposed in the component portion at a second port (406) between the component portion and the strap. A control circuit (407) is operable with the driver and the frequency detector and is configured to determine a peak of a resonant frequency over a frequency range in the air chamber with the frequency detector that are a function of the corresponding volume and are responsive to signals produced by the driver, correlate the frequency of pressure variations determined with a user input, and perform an operation based upon the user input.

19 Claims, 14 Drawing Sheets

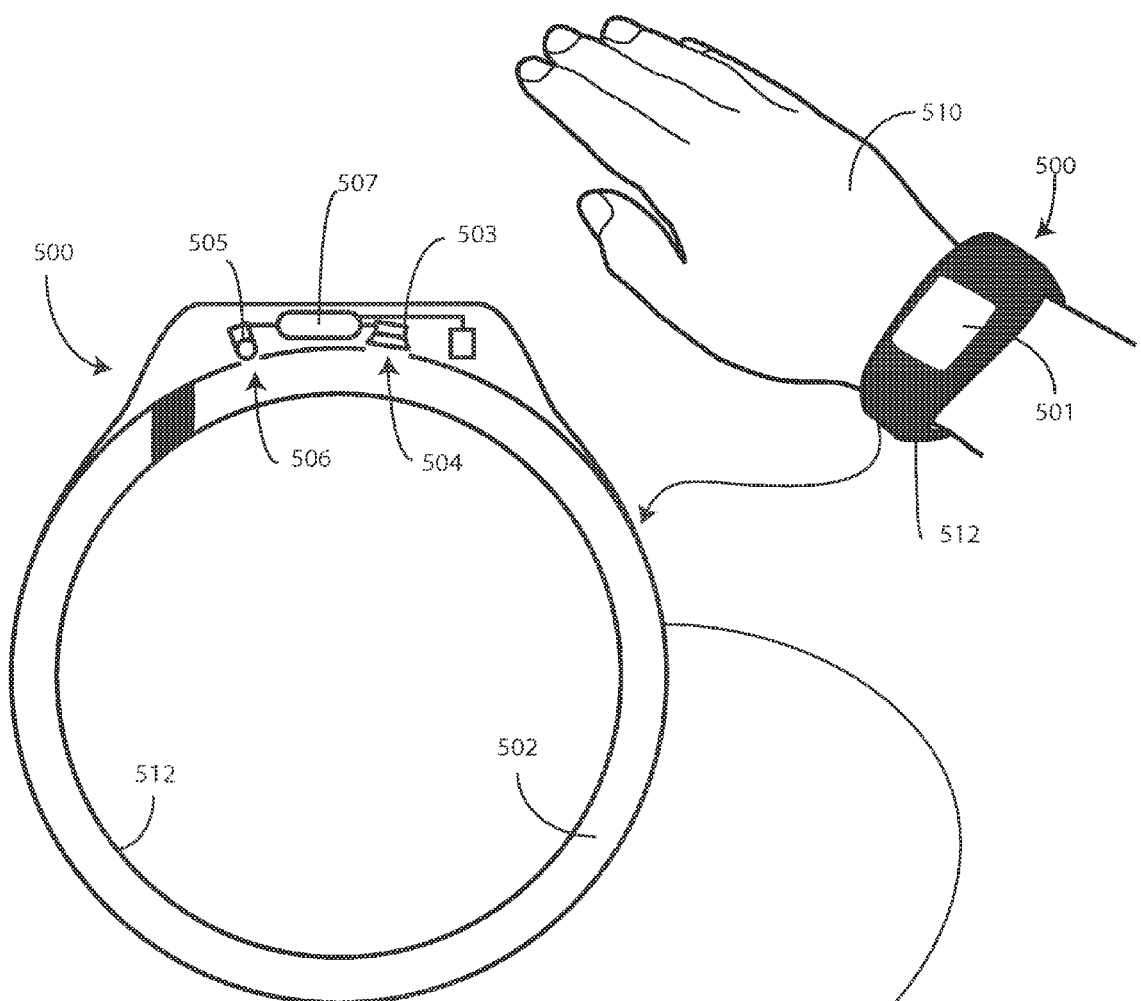
FIG. 5
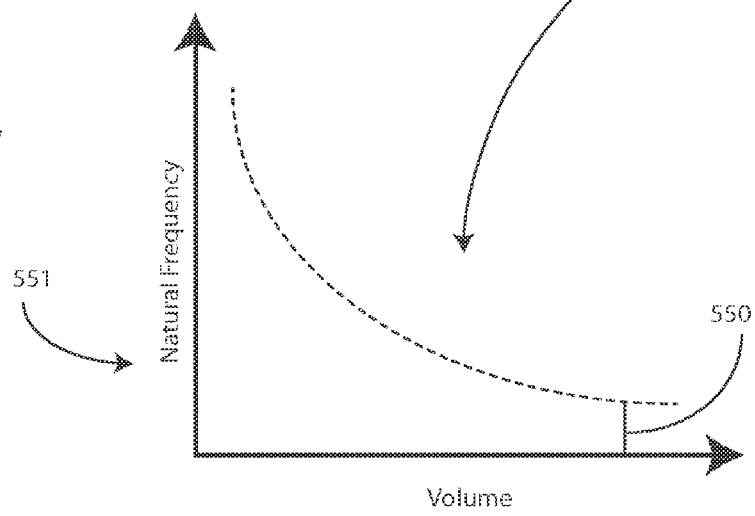

WEARABLE DEVICE WITH ACOUSTIC USER INPUT AND METHOD FOR SAME

BACKGROUND

1. Technical Field

This invention relates generally to electronic devices, and more particularly to wearable electronic devices.

2. Background Art

Advances in electronic device design have resulted in many devices becoming smaller and smaller. Portable electronic devices that once were the size of a shoebox now fit easily into a pocket. The reduction in size of the overall device means that the displays and user interfaces have also gotten smaller. It is sometimes challenging, when using small user interfaces, to accurately input data to a device. While stand-alone keypads and user interfaces can be used with portable electronic devices, the use of these stand-alone devices complicates the system, as it generally requires additional power sources, hardware integration, and either wired or wireless communication between the stand-alone device and the portable electronic device.

It would be advantageous to have an improved user interface suitable for use with a portable electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 illustrates another explanatory embodiment of a wearable device in use in accordance with one or more embodiments of the invention.

Figure 1:
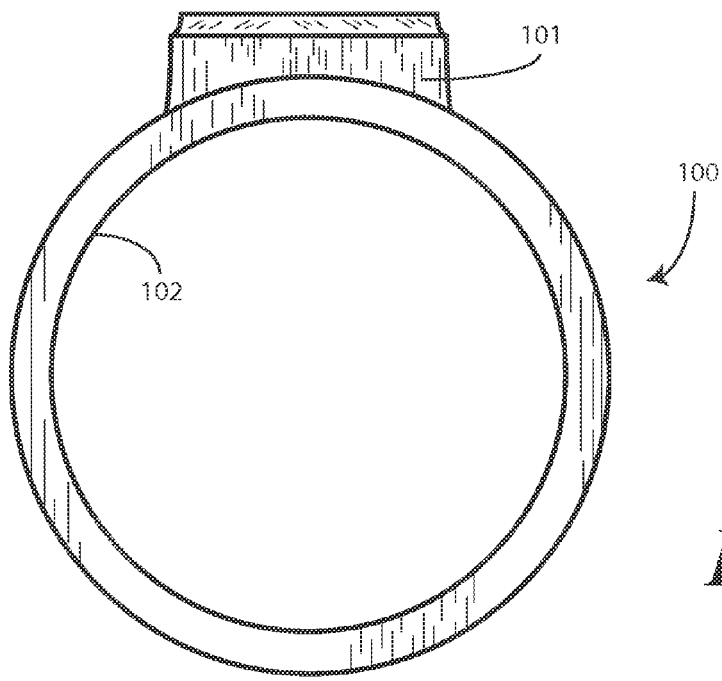
FIG. 1 illustrates a side elevation view of one explanatory embodiment of a wearable device configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to determining user input by determining a peak frequency resulting from pressure variations in a strap of a wearable device and correlating that peak frequency with a predetermined user input. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of determining user input from changes in peak frequencies that are responsive to a driver, as detected by a frequency detector or microphone, that are described herein. The non-processor circuits may include, but are not limited to, microprocessors, memory devices, a radio receiver, a radio transmitter, signal drivers, clock circuits, power source circuits, and user input devices. As such, these functions may be interpreted as steps of a method to perform user input detection from changes in frequencies that are a function of a volume defined in a hollow, compressible strap of a wearable device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention provide a new and useful user input device for portable electronic devices. Specifically, a mechanical strap, dongle, or extension manufactured from a compressible material defines a volume therein. A driver is disposed at a first port of the strap, dongle, or extension. A frequency detector, such as a microphone, is then disposed at a second port of the strap, dongle, or extension. When the driver excites the air disposed within the volume over a frequency range, a natural frequency of resonance will be created within the volume that will also have a corresponding peak frequency. This phenomenon is similar to that found in a Helmholtz radiator.

When a user applies pressure to a portion of the strap, dongle, or extension, the user can "clamp" the strap, dongle, or extension together, thereby reducing the volume adjacent to the first and second ports. Consequently, when the driver excites this new, smaller volume over a frequency range, the peak frequency will be higher than it was with the original, larger volume. The frequency detector can be configured to detect this change in peak frequency and correlate it to a predetermined user input. For example, where the volume is present in a strap of a wearable electronic device configured to be worn on the wrist, demarcations such as "1," "2," "3," etc., can be printed about the strap at different locations. When the user touches each location, the peak frequency changes. The frequency detector can detect these changes in peak frequency and can correlate them with predefined volumes that would result when the user touches a predetermined area. Accordingly, embodiments of the invention can provide a telephone keypad, for example, that is disposed along the strap of a wearable device, and that uses no electronics whatsoever. Since the strap is constantly flexing, the lack of electronic parts afforded by embodiments of the present invention is highly beneficial and results in enhanced reliability, usability, improved style, and more aesthetically pleasing form factors.

Embodiments of the invention thus offer advantages over prior art devices, such as those that use an electronic keypad disposed about the strap of wearable device. The inclusion of electronic components and power sources in the strap greatly complicates the overall design, not to mention the strap-to-device interface, which must include connectors and contacts. Said differently, attempting to move a keypad or other control device into a strap results in complex electrical interface that is required between the strap and the electronic device. With embodiments of the present invention, the strap can be used as a fully operable control device, yet one that does not require any electrical components.

In one or more embodiments, an electronic device, which can be wearable, has an acoustic transmitter and a receiver that are disposed near ports of an acoustic chamber defined in a strap or other device. In one or more embodiments, the acoustic transmitter and receiver can also be used for receiving voice input from a user, and delivering acoustic signals to a user, such as when the device is configured as a mobile telephone and the user is employing the acoustic transmitter and receiver to make calls. A control circuit, working with the acoustic transmitter and receiver is configured to measure the deformation in the acoustic chamber by detecting changes in the peak frequency of the chamber. These deformations are correlated to predefined user inputs. The user inputs can be used to detect keypad inputs, wrist button inputs, or to enable health monitoring applications or other features.

While there are many electronic devices suitable for use with embodiments of the invention, one particular application well suited for use with embodiments described herein is that of "wearable" devices. Such devices are described generally in commonly assigned, co-pending U.S. application Ser. No. 13/297,952, entitled, "Methods and Devices for Clothing Detection about a Wearable Electronic Device," Dickinson, et al., inventors, filed Nov. 16, 2011, and U.S. application Ser. No. 13/297,965, entitled, "Display Device, Corresponding Systems, and Methods for Orienting Output on a Display," Dickinson, et al., inventors, filed Nov. 16, 2011, and US Application No. PCT/US12/64,300, entitled "Display Device, Corresponding Systems, and Methods Therefor, Cauwels et al., inventors, filed Nov. 9, 2012, each of which are incorporated herein by reference for all purposes.

Figure 2:
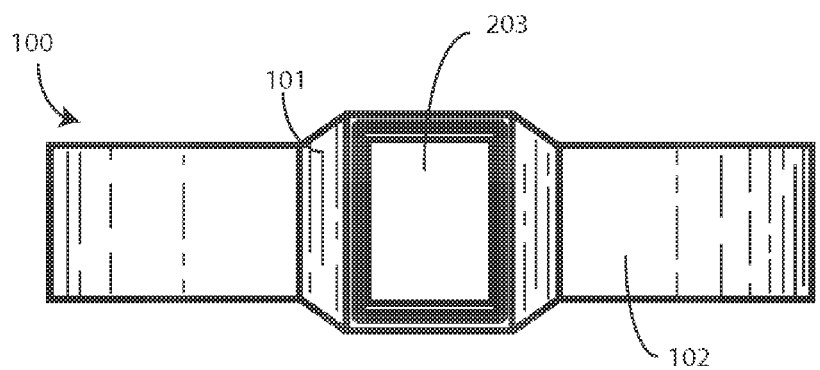
FIG. 2 illustrates a top plan view of one explanatory embodiment of a wearable device configured in accordance with one or more embodiments of the invention.
Figure 3:
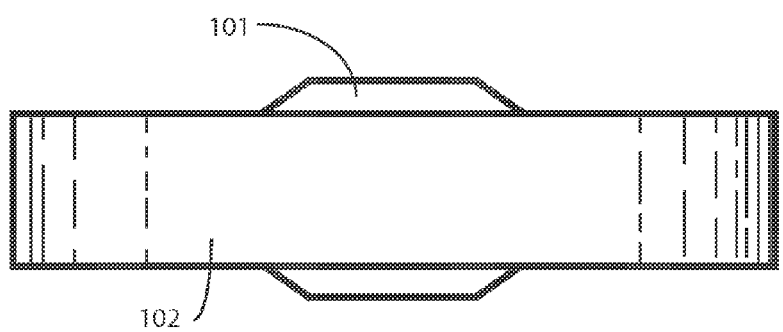
FIG. 3 illustrates a bottom plan view of one explanatory embodiment of a wearable device configured in accordance with one or more embodiments of the invention.

Turning now to FIGS. 1-3, illustrated therein is one embodiment of an electronic device 100 configured in accordance with one or more embodiments of the invention. The explanatory electronic device 100 of FIG. 1 is configured as a wearable device, as wearable electronic devices are well suited for embodiments of the invention due to their smaller user interfaces and displays. However, it will be clear to those of ordinary skill in the art that other electronic devices are equally suited to employing the mechanical user interfaces described herein. For example, rather than the electronic device 100 being configured as a wearable device with the mechanical user interface being coupled as a strap, the electronic device may be configured as a mobile telephone or tablet, with an extension dongle coupled thereto defining the mechanical user interface, or as a hollow, pliant structure integrated into a housing or device that defines its mechanical user interface.

As shown in FIGS. 1-3, the electronic device includes a component portion 101 and a strap 102 or other hollow pliant structure that are coupled together to form a wrist wearable device. The term "pliant" is used to refer to a material that is one or more of pliant, compressible, yielding, bending, or otherwise deformable, in response to pressing, sliding, or translating forces upon the structure. The component portion 101 serves as the nerve center of the device as it houses the electronic components of the device, including the battery or other power source, the processing circuitry, memory circuitry, and display circuitry. The illustrative component portion 101 of FIGS. 1-3 includes a display 203. The display 203, which may be touch sensitive, forms a visible output for the electronic device 100.

In one embodiment, the strap 102 is a mechanical device that is devoid of any electrical components. In one embodiment, the strap 102 is manufactured from a pliant material, such as silicone, and is integrated with the component portion 101. For example, in one embodiment, the component portion 101 has an internal housing structure. About the internal housing structure is a cover layer manufactured from the same material as the strap 102 in a single, unitary configuration.

Figure 4:
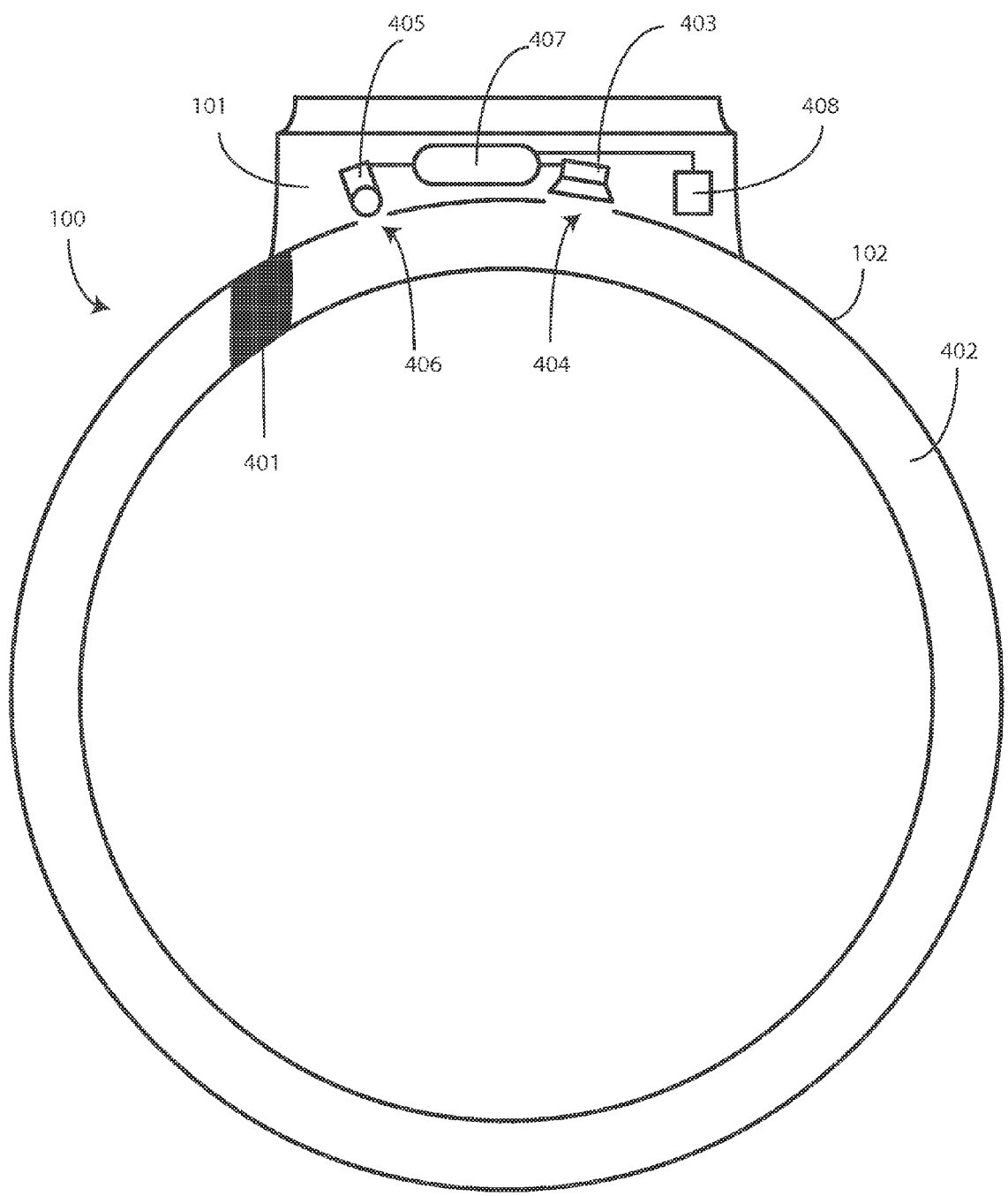
FIG. 4 illustrates a sectional side elevation view showing internal components of one explanatory embodiment of a wearable device configured in accordance with one or more embodiments of the invention.

Turning now to FIG. 4, illustrated therein is a sectional view of the electronic device 100 of FIGS. 1-3. As shown in FIG. 3, the strap 102 is hollow. Accordingly, the strap 102 defines an air chamber 402 therein having a corresponding volume. The volume is defined by the outer portions of the strap 102 and a sealing member 401.

A driver 403 is disposed in the component portion 101 at a first port 404 defined between the component portion 101 and the strap 102. Note that in other embodiments, the driver 403 could be disposed in the strap 102 rather than in the component portion 101, such as in a portion of the strap 102 adjacent to, or beneath, the component portion 101. The driver 403 is configured to excite the air disposed within the air chamber 402 when active. In one embodiment, this is done by delivering acoustic waves over a frequency range to the air chamber 402 through the first port 404. For example, in one embodiment, the driver 403 comprises a loudspeaker. In another embodiment, the driver 403 comprises a piezoelectric transducer. Other devices capable of exciting the air in the air chamber 402 will be obvious to those of ordinary skill in the art having the benefit of this disclosure.

A frequency detector 405 is then disposed in the component portion 101 at a second port 406 defined between the component portion 101 and the strap 102. As with the driver 403, in alternate embodiments the frequency detector 405 can be disposed in the strap 102 rather than the component portion 101, such as in locations adjacent to the component module or beneath the same. The frequency detector 405 is configured to determine a peak frequency over a frequency range in the air chamber 402 that is a function of the corresponding volume and that is responsive to the excitement signals produced by the driver 403. For example, the driver 403 can deliver acoustic signals over a frequency range to the air chamber 402 to stimulate the air in the air chamber 402. The air in the air chamber 402 will then tend to resonate at its natural frequency. As with a Helmholtz resonator, the natural frequency and peak frequency are a function of the speed of sound, the cross sectional areas of the first port 404 and the second port 406, and the static volume of the air chamber 402. The frequency detector 405, which in one embodiment is a microphone, can then measure the frequency of pressure variations over a frequency range that determines one or more peak frequencies associated with or defined by the volume and deliver electronic signals corresponding thereto to a control circuit 407.

The control circuit 407 is operable with the driver 403 and the frequency detector 405. In one or more embodiments, the control circuit 407 can also be operable with a user interface disposed along the component portion 101, such as a touch sensitive display. The control circuit 407 can also be operable with an output device (not shown), such as an external loudspeaker, visible display, or haptic feedback device.

The control circuit 407 can additionally be operable with a memory. The control circuit 407, which may be any of one or more microprocessors, programmable logic, application specific integrated circuit device, or other similar device, is capable of executing program instructions and methods described herein. The program instructions and methods may be stored either on-board in the control circuit 407, or in the memory, or in other computer readable media coupled to the control circuit 407. The control circuit 407 can be configured to operate the various functions of the overall electronic device 100, and also to execute software or firmware applications and modules that can be stored in a computer readable medium, such as the memory. The control circuit 407 can execute this software or firmware, in part, to provide device functionality. The memory may include either or both static and dynamic memory components, may be used for storing both embedded code and user data. One suitable example for control circuit 407 is the MSM7630 processor manufactured by Qualcomm, Inc. The control circuit 407 may operate one or more operating systems, such as the Android™ mobile operating system offered by Google, Inc. In one embodiment, the memory comprises an 8-gigabyte embedded multi-media card (eMMC).

While only the control circuit 407, a battery 408, the driver 403 and the frequency detector 405 are shown in FIG. 4 for ease of illustration, it will be clear to those of ordinary skill in the art having the benefit of this disclosure that additional components and modules can be included in the component portion 101 as well. The illustrated components and modules are those used for receiving user input from the strap 102 as described herein. The additional components and modules can be included in different combinations. The other components or modules can be included or excluded based upon need or application.

As shown in FIG. 4, in one embodiment all electrical components, including the control circuit 407, driver 403, and frequency detector 405, as well as associated components such as the memory described above and power circuitry such as battery 408. In one embodiment the strap 102 is purely a mechanical device that is devoid of any electrical components.

In one embodiment, the control circuit 407 is configured to cause the driver 403 to excite the air in the air chamber 402. This can be done by delivering acoustic signals from the driver 403 to the air chamber 402 through the first port 404. The acoustic signals can be delivered continually, at a periodic basis, randomly, or on a predefined schedule. For example, in one embodiment, the acoustic signals can comprise a pulse signal given at periodic intervals. In another embodiment, the acoustic signals can comprise a continuous signal that is applied when the electronic device 100 is active. In other embodiments, the acoustic signal can be continuous when active, but periodic when the electronic device 100 is in a sleep or low power state.

The air in the air chamber 402 then tends to resonate at its natural frequency, which can correspond to one or more peak frequencies, in response to the acoustic signals. Using the frequency detector 405, the control circuit 407 can be configured to determine a peak frequency of the pressure variations in the air chamber 402. As noted above, this determined peak frequency is a function of the corresponding volume of the air chamber. The peak frequency is further responsive to signals produced by the driver 403, which serve to excite the air in the air chamber 402.

Once the peak frequency has been determined, the control circuit 407 can be configured to correlate the determined peak frequency of pressure variations with a usage state. In FIG. 4, the strap 102 is in a neutral state with the pliant material forming the same not being stretched or deformed in any way. Consequently, the control circuit 407 can correlate the peak frequency determined in this state with a rest or natural state of the device. The control circuit 407 can therefore correlate this user input as "no user input being applied." However, the pliant material of the strap 102 is configured to be deformable. Accordingly, the volume of the air chamber 402, in one embodiment, is configured to be alterable by compression of the pliant material that constitutes the strap 102.

When a user applies input to the device by compressing the pliable material of the strap 102, as will be shown in FIGS. 5-8, the user can alter the volume of the air chamber 402 by "pinching" the sides of the strap 102 together. When the volume changes, the peak frequency of the air chamber 402 increases. The control circuit 407 can determine the amount of increase—compared to the peak frequency of the rest or natural state of the strap 102—to determine where the user is compressing the sides of the strap 102 together. This determined peak frequency can then be correlated with a user input. The control circuit 407 can then perform an operation or launch an application in response, or based upon, the user input.

To illustrate how user input is detected, turn first to FIG. 5. Illustrated in FIG. 5 is a user 510 wearing another explanatory electronic device 500 configured in accordance with embodiments of the invention. In addition to being shown on the user's arm, the electronic device 500 is shown in a sectional view to reveal the components disposed in the component portion 501, as well as the lack of any components in the strap 512. As with the electronic device (100) of FIGS. 1-4, the explanatory electronic device 500 of FIG. 5 includes a driver 503 disposed in the component portion 501 at a first port 504 defined between the component portion 501 and the strap 512, a frequency detector 505 disposed in the component portion 501 at a second port 506 defined between the component portion 501 and the strap 512, and a control circuit 507 that is operable with the driver 503 and the frequency detector 505.

The strap 512 of FIG. 5 is in its natural rest state in that the pliant material of the strap is neither compressed nor stretched. When the driver 503 delivers a test noise to the air chamber 502, the air in the air chamber 502 resonates at its natural frequency, which may have a corresponding peak when represented in the frequency domain. The frequency detector 505, which in this embodiment is a microphone, then detects the resulting peak frequency of pressure variations as sound through the second port 506. As will be described with reference to FIGS. 6-8, the received acoustic sound can then be used as a control signal for applications and operations by the control circuit 507. For example, the control signal can be correlated to input from a numeric keypad, input from a volume control, and so forth. When the pliant material of the strap 512 is stretched, such as may occur when the strap 512 is stretched tightly about a user's wrist, this can be used to launch applications to monitor health conditions or to launch other applications. In one or more embodiments, these applications require the electronic device 500 to have good contact with a user's skin. This contact can be confirmed by a stretching of the strap 512.

In FIG. 5, since the strap 512 is in its rest or natural state, the received peak frequency 550 corresponds to a lack of user input. The volume of the air chamber 502 is at its maximum. Correspondingly, the peak frequency 550 of the strap 512 is at its lowest natural frequency as shown in graph 551.

Figure 6:
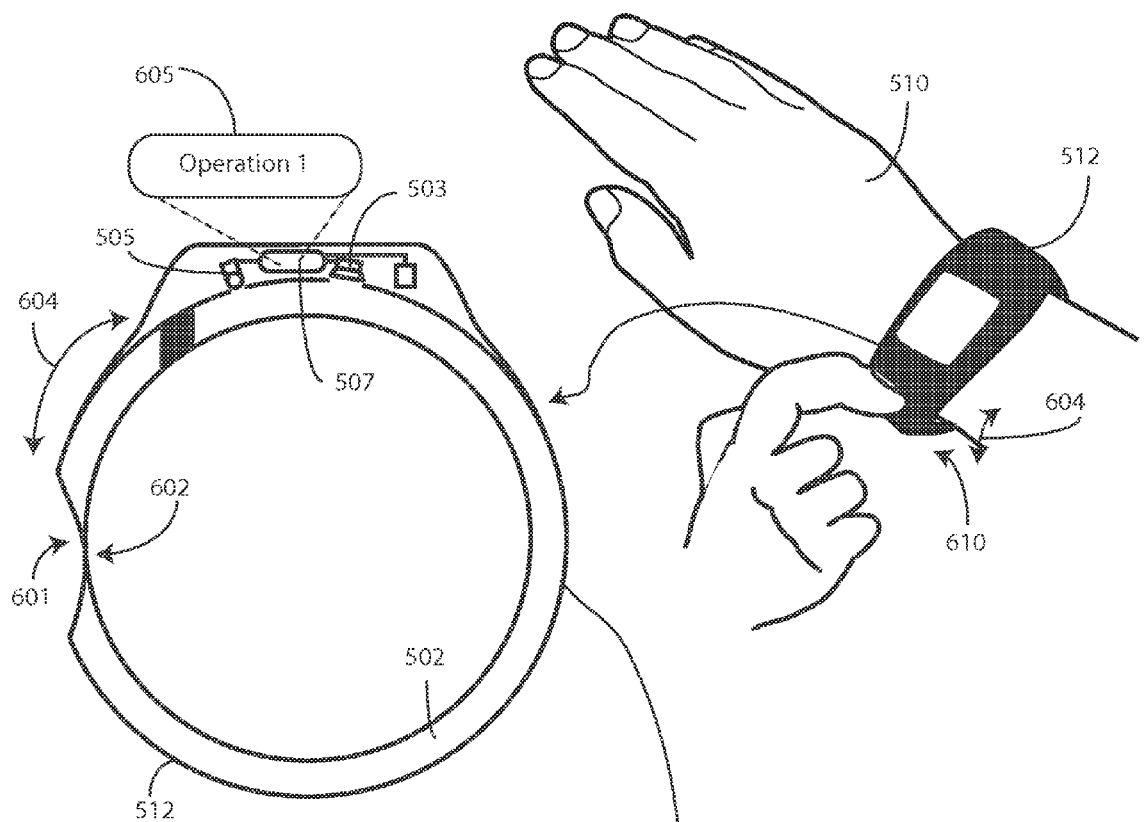
FIG. 6 illustrates a user providing input to an explanatory embodiment of a wearable device configured in accordance with one or more embodiments of the invention.
Figure 6:
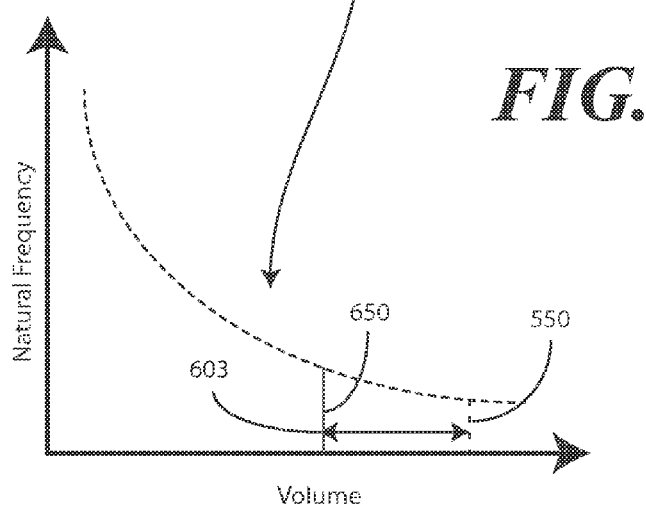

Turning now to FIG. 6, the user 510 is applying user input 610 by touching the strap 512 at a first location 601. This user input 610 causes the strap 512 to be pinched 602, which changes the volume seen by the driver 503 and the frequency detector 505 to become reduced relative to the volume seen in FIG. 5. As the first resonant frequency of the air chamber 502 is a function of the volume of the air chamber 502, the peak frequency 650 responsive to signals from the driver 503 when the user input 610 occurs increases relative to the peak frequency 550 of the rest state by a difference 603. The difference 603 corresponds to a distance 604 along the strap 512 from the component portion 501 where the user 510 provided the user input 610. The control circuit 507, in one embodiment, can estimate the difference 603 in frequency and correlate it, using a look-up table or other correlation method, to determine where the user input 610 was applied. Accordingly, the control circuit 507 can use the user input 610 to perform operations 605 based upon the user input 610, launch applications, or to perform other activities. Where, for instance, the strap 512 has numbers disposed therealong, the user 510 can touch the different numbers by touching different locations of the strap. The control circuit 507 then determines the location by determined frequency difference, correlates that to a number, and uses the user input 610 accordingly. A telephonic keypad, other keypad, or wrist button can therefore be configured into the strap 512 with no need to include electrical components in the strap 512.

Figure 7:
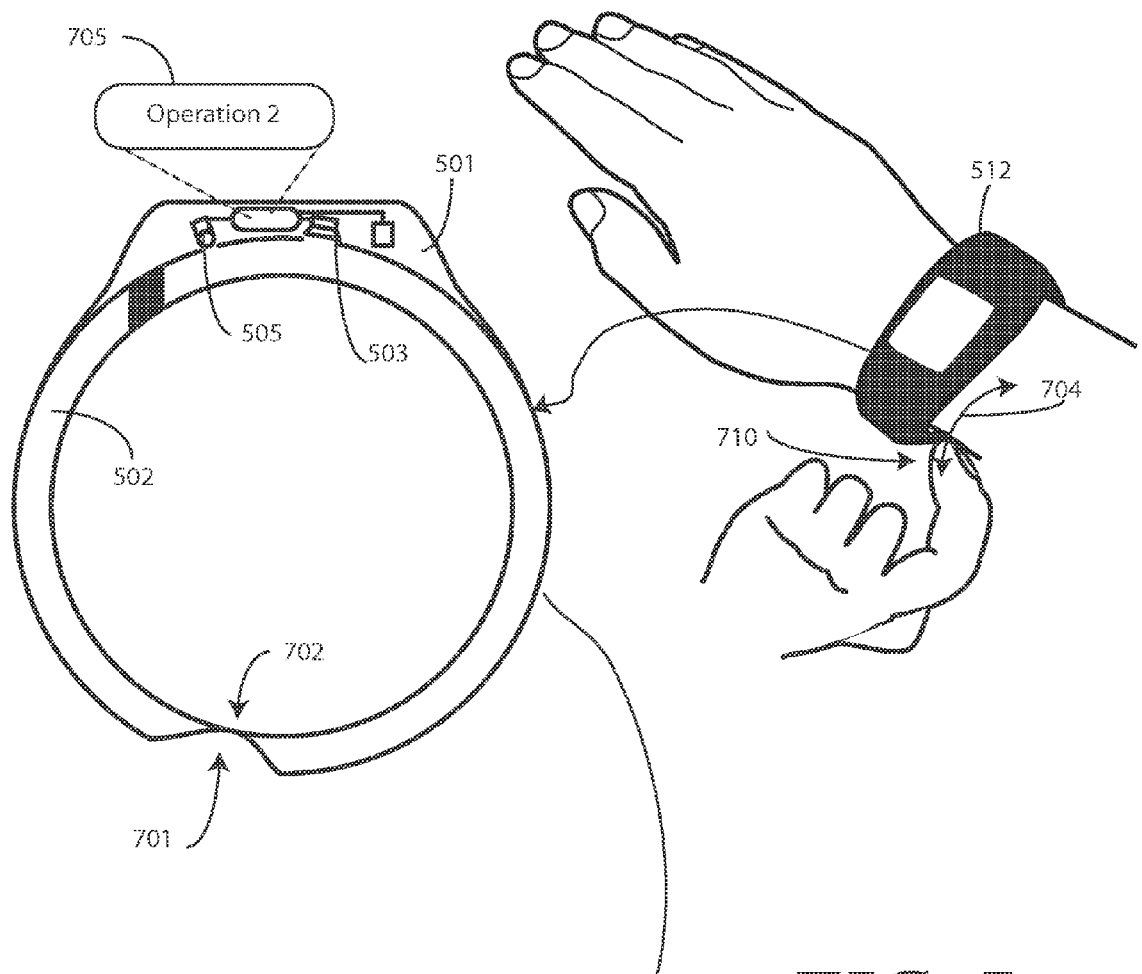
FIG. 7 illustrates a user providing additional input to an explanatory embodiment of a wearable device configured in accordance with one or more embodiments of the invention.

Illustrating the concept a step further, and turning now to FIG. 7, illustrated therein is the user 510 is applying user input 710 by touching the strap 512 at a second location 701, which is different from the first location (601) shown in FIG. 6. This user input 710 causes the strap 512 to be pinched 702, which changes the volume seen by the driver 503 and the frequency detector 505 to become reduced relative to the volume seen in either FIG. 5 or FIG. 6. As the first resonant frequency of the air chamber 502 is a function of the volume of the air chamber 502, the peak frequency 750, responsive to signals from the driver 503 when the user input 710 occurs, increases relative to the peak frequency 550 of the rest state or the peak frequency (650) of FIG. 6. The difference 703 in frequency between the at-rest and modified resonant frequencies corresponds to a distance 704 along the strap 512 from the component portion 501 where the user 510 provided the user input 710. The control circuit 507, in one embodiment, can estimate the difference 703 in frequency and determine where the user input 610 was applied. Accordingly, the control circuit 507 can use the user input 710 to perform an operation 705 based upon the user input 710. Note that the operation 705 of FIG. 7 is different from the operation (605) of FIG. 6 because the user input 710 occurred at a different location 701.

Figure 8:
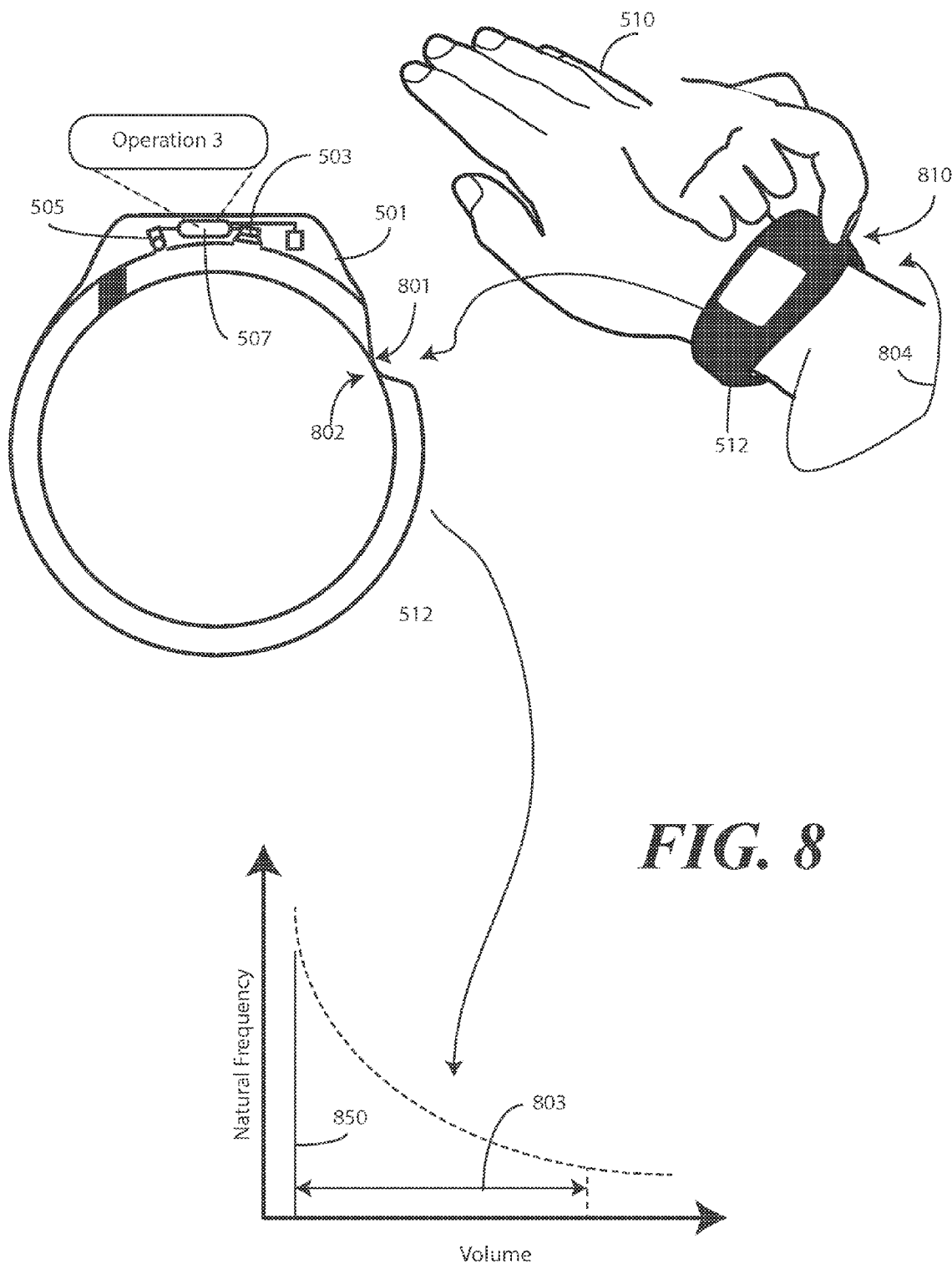
FIG. 8 illustrates a user providing another additional input to an explanatory embodiment of a wearable device configured in accordance with one or more embodiments of the invention.

Turning now to FIG. 8, the user 510 is applying user input 810 by touching the strap 512 at a third location 801. This user input 810 again causes the strap 512 to be pinched 802, which changes the volume seen by the driver 503 and the frequency detector 505 to become reduced relative to the volume seen in any of FIGS. 5-7. As the first resonant frequency of the air chamber 502 is a function of the volume of the air chamber 502, the peak frequency 850 responsive to signals from the driver 503, when the user input 810 occurs, again increases. The difference 803 in frequency between the at-rest and modified resonant frequencies corresponds to a distance 804 along the strap 512 from the component portion 501 where the user 510 provided the user input 810. The control circuit 507, in one embodiment, can estimate the difference 803 in peak frequency and determine where the user input 810 was applied. Accordingly, the control circuit 507 can use the user input 810 to perform a third operation 805 based upon the user input 810.

Figure 9:
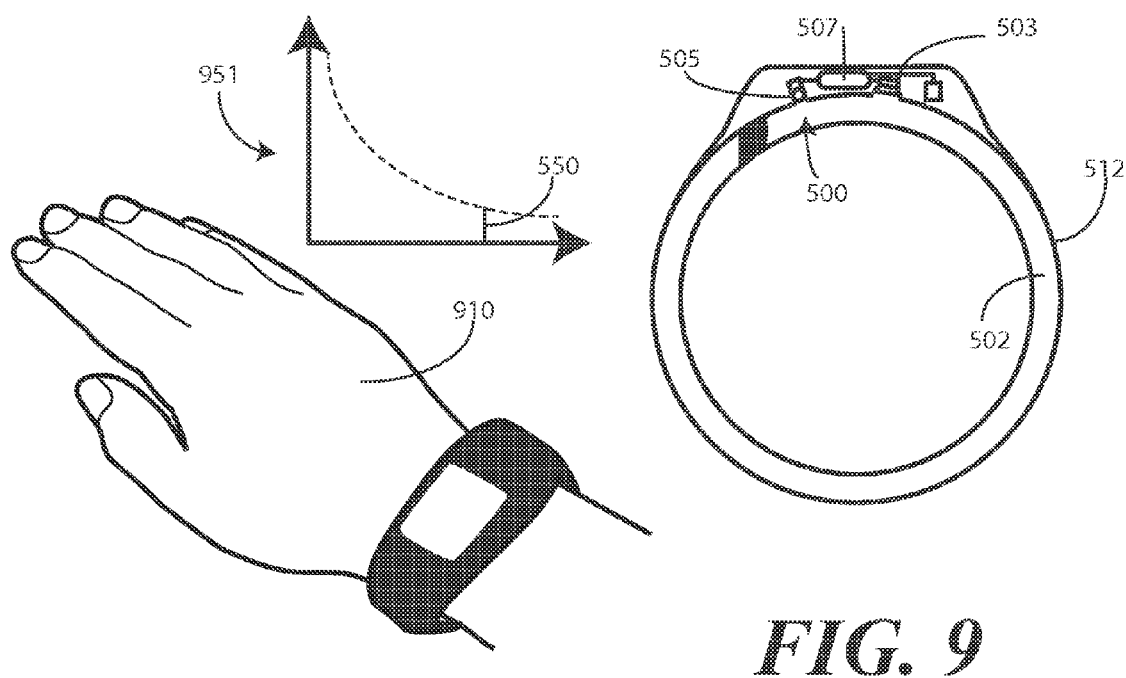
FIG. 9 illustrates a user wearing an explanatory embodiment of a wearable device configured in accordance with one or more embodiments of the invention.
Figure 10:
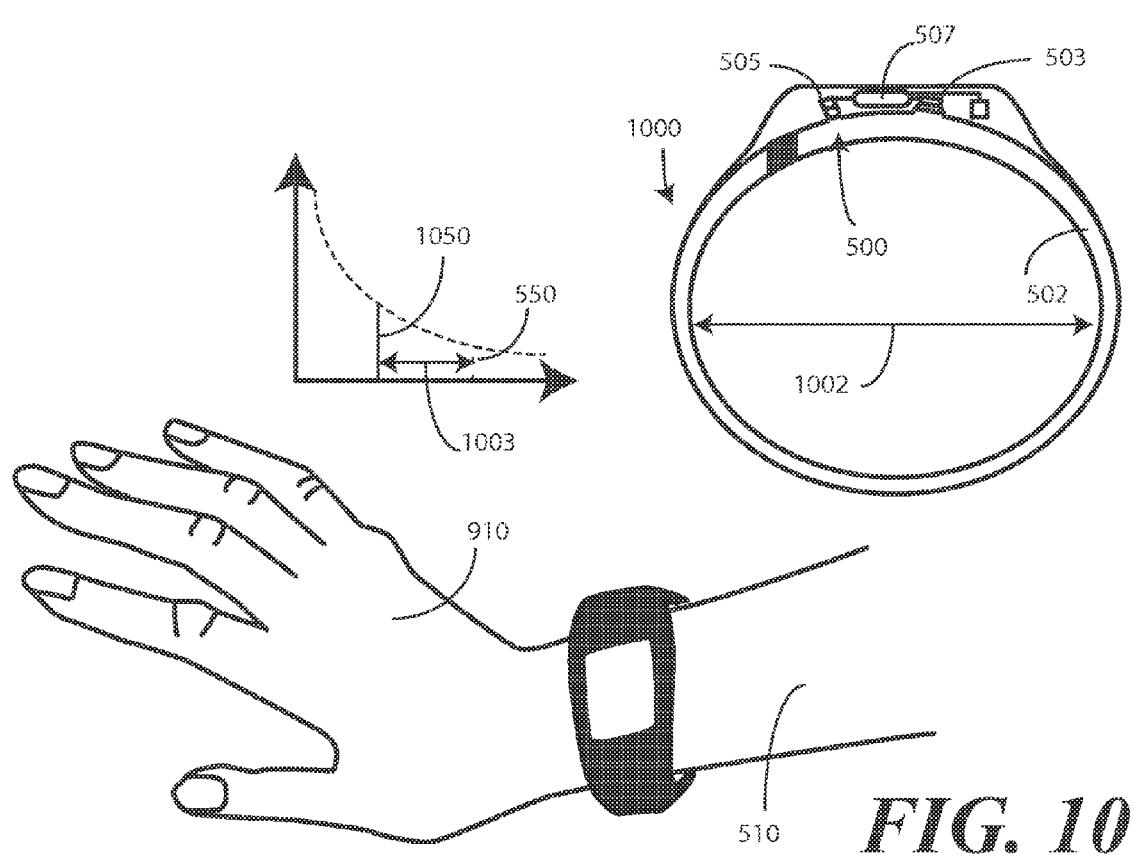
FIG. 10 illustrates a user providing additional input to an explanatory embodiment of a wearable device configured in accordance with one or more embodiments of the invention by stretching the strap.

Compression resulting from one type of user input 810 is not the only way embodiments of the invention can receive user input. In other embodiments, due to the pliable nature of the strap 102, user input can be detected when the strap 102 stretches. Turning now to FIGS. 9-10, illustrated therein is an embodiment illustrating how this occurs.

In FIG. 9, the strap 512 is in a neutral state with the strap's pliant material not being stretched or deformed in any way. This is due—in this illustrative embodiment—to the user's hand 910 being in a relaxed, extended position. Consequently, the control circuit 507 can use the driver 503 and frequency detector 505 to correlate the resonant frequency determined in this state with a rest or natural state of the device.

When the driver 503 delivers a test noise to the air chamber 502, the air in the air chamber 502 resonates. The frequency detector 505 then detects the resulting peak frequency of pressure variations as sound through the second port 506. Since the strap 512 is in its rest or natural state, the received peak frequency 550, which corresponds to the resonant frequency of the strap 512, and indicates to a lack of user input. The volume of the air chamber 502 is at its maximum. Correspondingly, the peak frequency 550 of the strap 512 corresponds to its lowest resonant frequency as shown in graph 951.

As noted above, in one or more embodiments, the pliant material of the strap 512 is configured to be deformable either by compression or by stretching. Turning to FIG. 10, the user 510 has flexed their hand 910, which has caused the strap 512 to stretch as shown in view 1000. This alternate form of user input causes the strap 512 to stretch, which changes the volume seen by the driver 503 and the frequency detector 505 to become reduced relative to the volume seen in FIG. 9. As the first resonant frequency of the air chamber 502 is a function of the volume of the air chamber 502, the peak frequency 1050 responsive to signals from the driver 503 when the stretching user input occurs increases relative to the peak frequency 550 of the rest state by a difference 1003. The difference 1003 corresponds to an amount of stretch 1002. The control circuit 507, in one embodiment, can estimate the difference 1003 in frequency and correlate it, using a look-up table or other correlation method, to determine the amount of stretch 1002. Accordingly, the control circuit 507 can use the stretch user input to perform operations, launch applications, or to perform other activities.

While the stretch 1002 was intentionally applied in FIG. 10 by the user 510 flexing their hand 910, it will be clear to those of ordinary skill in the art having the benefit of this disclosure that embodiments of the invention are not so limited. For example, in one embodiment, the user 510 may set the tension of the strap 512 while in a comfortable, resting state. The control circuit 507 may calibrate the resonant or peak frequency 550 that occurs in this rest state as a "normal" user state. It is known that various medical conditions can make the appendage about which the strap 512 is placed expand. For example, in some allergic reactions, a person's limbs may start to swell. In one embodiment, the control circuit 507 can be configured to monitor for a difference 1003 in resonant or peak frequency that exceeds a predetermined threshold. Illustrating by example, if the user's wrist expands by more than five percent, the control circuit 507 may be configured to initiate a health monitoring mode in which pulse, heart rate, or other vital signals are monitored. Where the control circuit 507 is operable with a wireless communication device, the control circuit 507 can be configured to notify medical personnel, family, or friends when the difference 1003 exceeds a predetermined threshold as well. Health monitoring is merely one example of a myriad of applications that can be launched by the control circuit 507 upon detecting a predetermined amount of stretch, as will be clear to those of ordinary skill in the art having the benefit of this disclosure.

Figure 11:
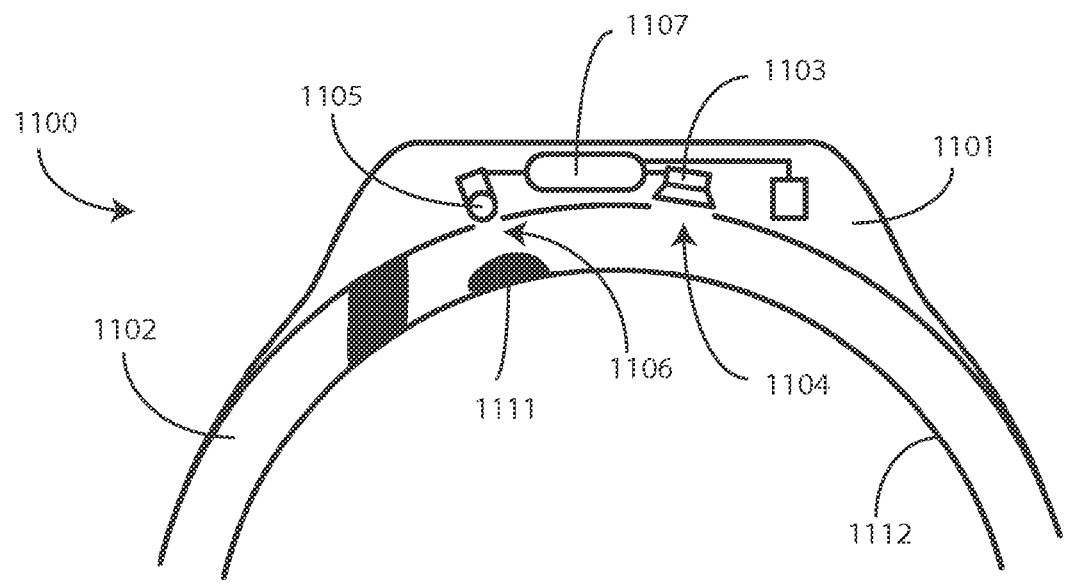
FIG. 11 illustrates another an explanatory embodiment of a wearable device configured in accordance with one or more embodiments of the invention.
Figure 12:
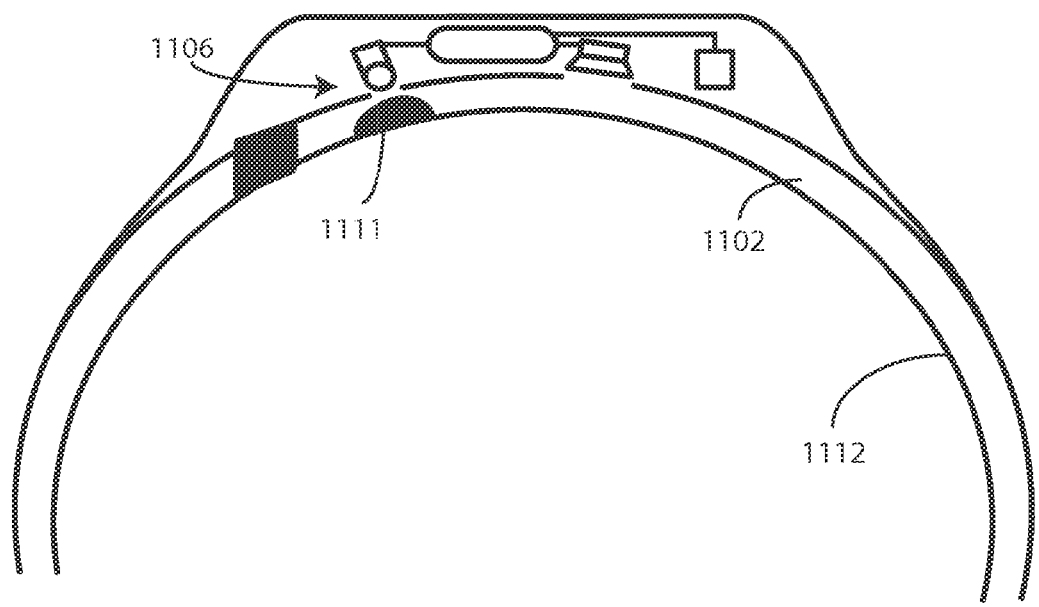
FIG. 12 illustrates another explanatory embodiment of a wearable device configured in accordance with one or more embodiments of the invention receiving input via stretch.

Turning now to FIGS. 11-12, illustrated therein is an alternate form of an electronic device 1100 configured in accordance with one or more embodiments of the invention. The electronic device 1100 of FIG. 11 includes many components that are common with previously discussed embodiments, including a driver 1103 disposed in the component portion 1101 at a first port 1104 defined between the component portion 1101 and the strap 1112, a frequency detector 1105 disposed in the component portion 1101 at a second port 1106 defined between the component portion 1101 and the strap 1112, and a control circuit 1107 that is operable with the driver 1103 and the frequency detector 1105.

In addition to these components, the electronic device 1100 of FIG. 11 further includes a mechanical protrusion 1111 proximately disposed in the air chamber 1102 of the strap 1112 with the first port 1104. The mechanical protrusion 1111 is configured to increase an acoustic resistance of the first port 1104 when the pliant material of the strap 1112 is stretched. Said differently, the mechanical protrusion 1111 is configured to change the acoustical properties of the first port 1104 when the strap 1112 is stretched.

The strap 1112 of FIG. 11 is in its natural rest state in that the pliant material of the strap is neither compressed nor stretched. When the driver 1103 delivers a test noise to the air chamber 1102, the air in the air chamber 1102 resonates. The frequency detector 1105 then detects the resulting peak frequency of pressure variations as sound through the second port 1106.

Turning now to FIG. 12, when the pliant material of the strap 1112 is stretched, the mechanical protrusion 1111 moves toward and/or into the first port 1104. This increases the acoustical resistance of the first port 1104 and changes its acoustic properties. As the resonance of the air chamber 1102 is a function not only of its volume but also the ports, including the first port 1104, the use of the mechanical protrusion 1111 can thus add an additional level of control over the frequency differences that will be obtained when the strap 1112 is stretched.

Figure 13:
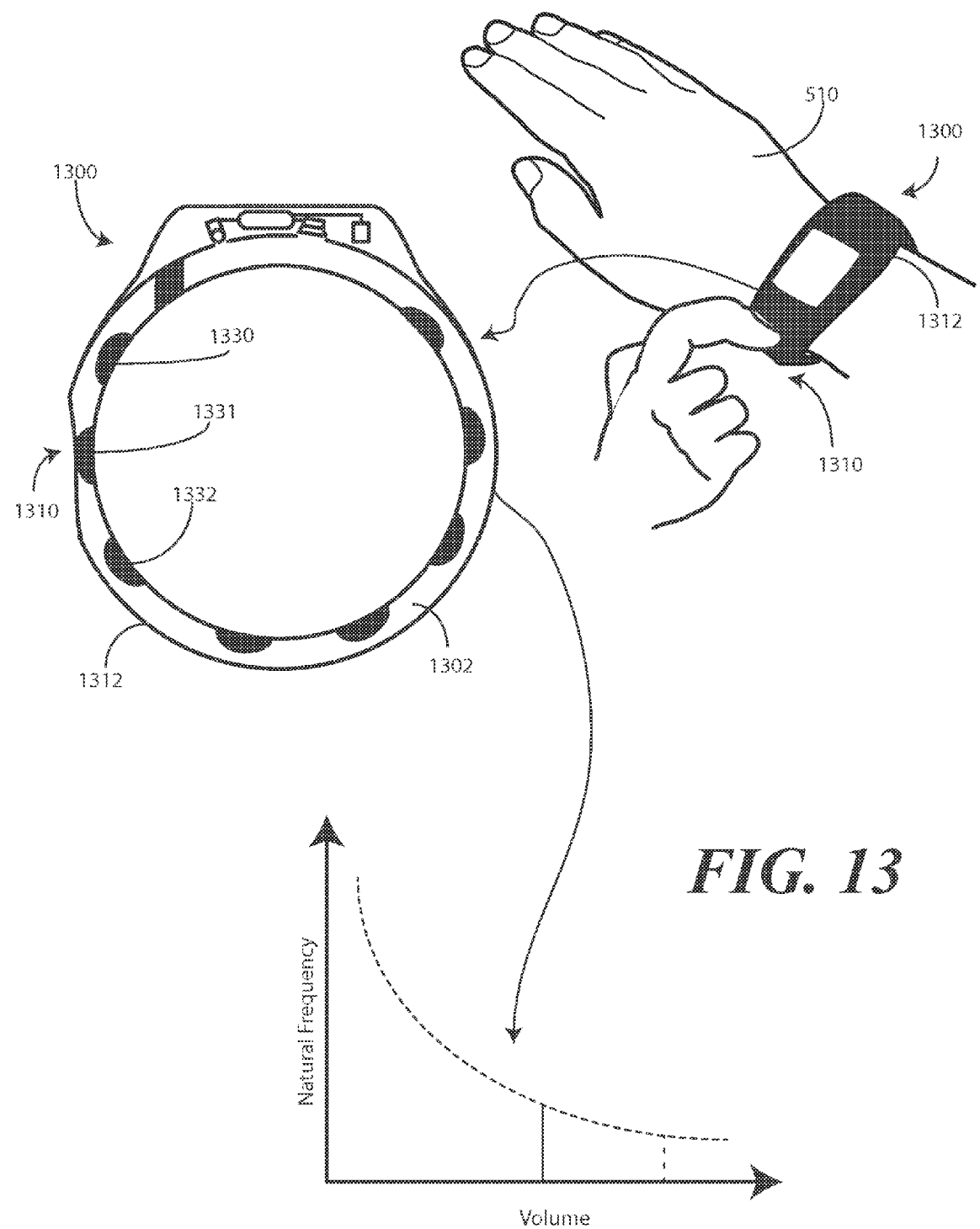
FIG. 13 illustrates another explanatory embodiment of a wearable device in use and having one or more port sealing features configured in accordance with one or more embodiments of the invention.

Turning now to FIG. 13, illustrated therein is yet another electrical device 1300 configured in accordance with one or more embodiments of the invention. The strap 1312 of the electronic device is equipped with one or more compression sealing features 1330,1331,1332. The compression sealing features 1330,1331,1332 offer a plurality of uses. First, as shown, the compression sealing features 1330,1331,1332 provide a tactile element beneath the outer surface of the strap 1312 that the user 510 can feel when applying user input 1310. Note that the one or more compression sealing features 1330,1331,1332 can, in one or more embodiments, be made from a mechanically compressable component or material to provide tactile feedback to the user. In effect, the compression sealing features 1330,1331,1332 can function like a hidden fret of a guitar, alerting the user 510 whether an appropriate user input graduation has been properly selected.

A second advantage offered by the compression sealing features 1330,1331,1332 is that they reduce the amount of compression the user 510 must apply to alter the volume of the air chamber 1302 defined within the strap 1312. As shown in the sectional view, the amount of compression required by the user input 1310 to alter the volume of the air chamber 1302 is less than, for example, shown in FIG. 6 due to the fact that compression sealing feature 1331 is raised from the internal surface of the strap 1312.

Figure 14:
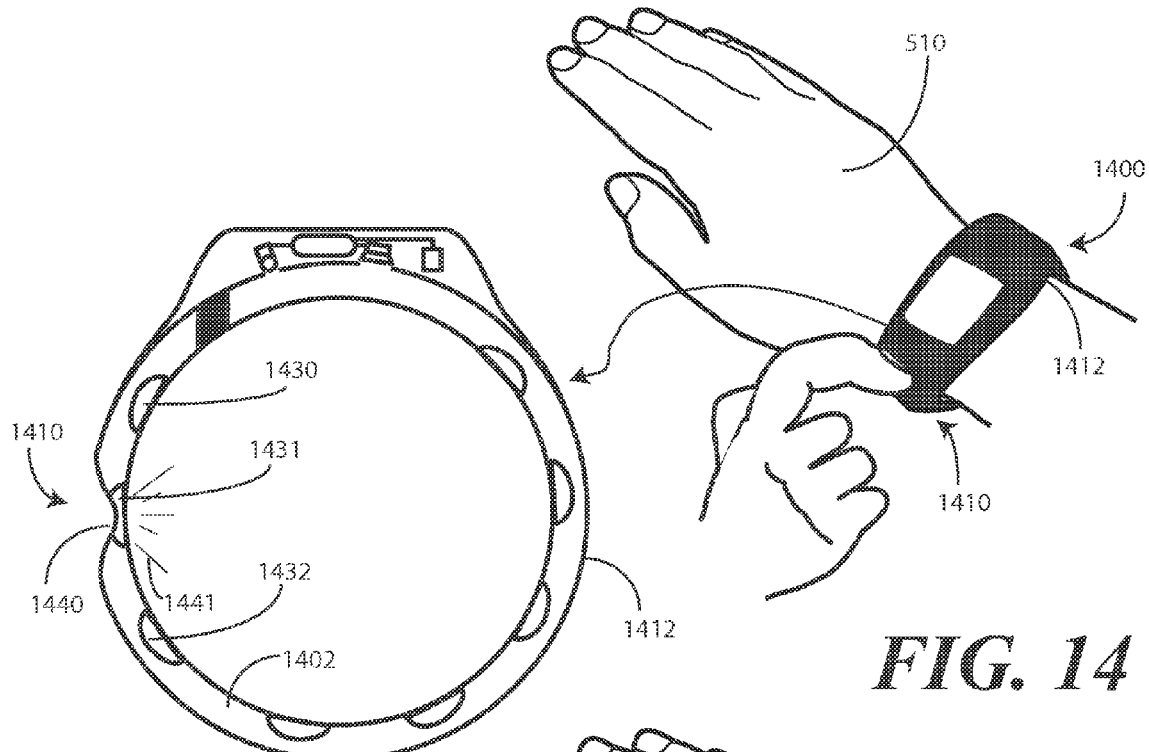
FIGS. 14-15 illustrate another explanatory embodiment of a wearable device in use and having one or more port mechanical tactile feedback mechanisms configured in accordance with one or more embodiments of the invention.
Figure 15:
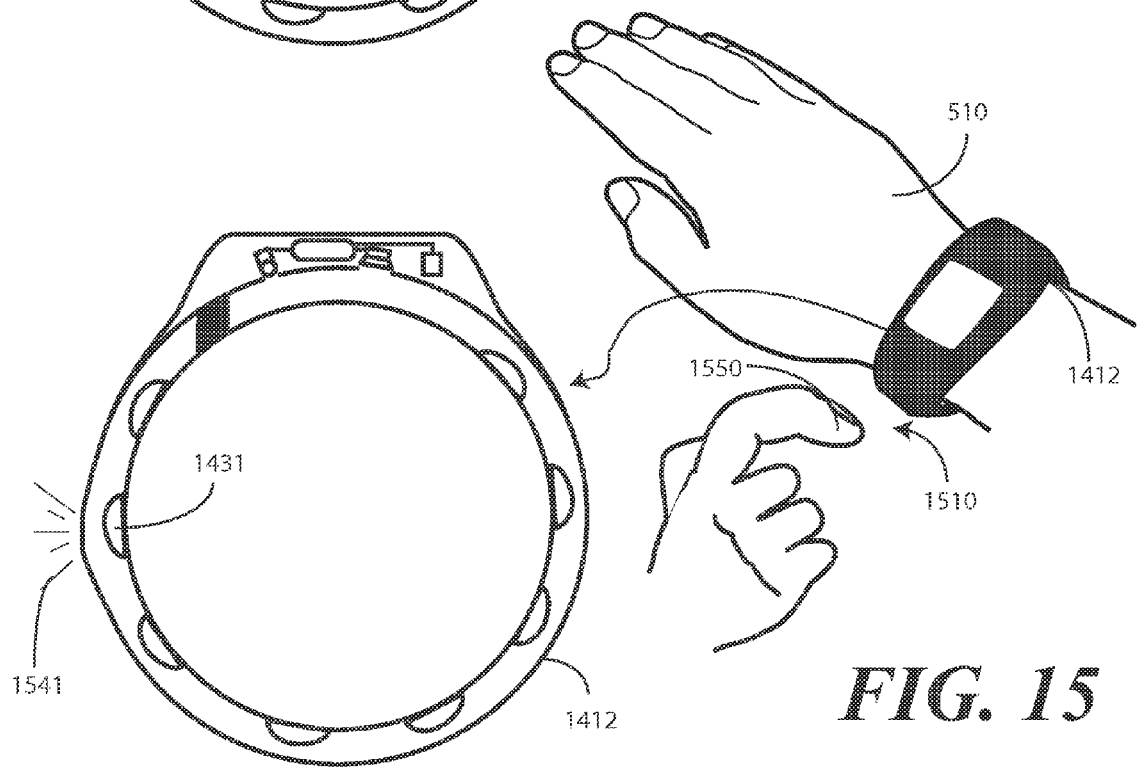

Turning now to FIGS. 14-15, illustrated therein is an alternate feature that can be disposed within the strap. In the electronic device 1400 of FIGS. 14-15, the strap 1412 includes one or more mechanical tactile feedback devices 1430,1431,1432 disposed along a surface of the air chamber 1402 of the strap 1412. The mechanical tactile feedback devices 1430,1431,1432 of FIGS. 14-15 are configured as mechanical popple devices that compress 1440 when user input 1410 is applied. Thus, as shown in FIG. 14, when the user 510 applies user input 1410 mechanical tactile feedback device 1431 compresses, thereby delivering a haptic and/or acoustic signal 1441 to the user's wrist. As shown in FIG. 15, when the user 510 releases 1510 their finger 1550 from the strap 1412, mechanical tactile feedback device 1431 releases with a "pop" to deliver a haptic and/or acoustic signal 1541 as well. While mechanical popple devices are one form of a mechanical tactile feedback device 1431 suitable for use with embodiments of the invention, it will be clear to those of ordinary skill in the art having the benefit of this disclosure that other devices can be substituted as well, including spring-loaded haptic devices, cantilevered haptic devices, and so forth.

Figure 16:
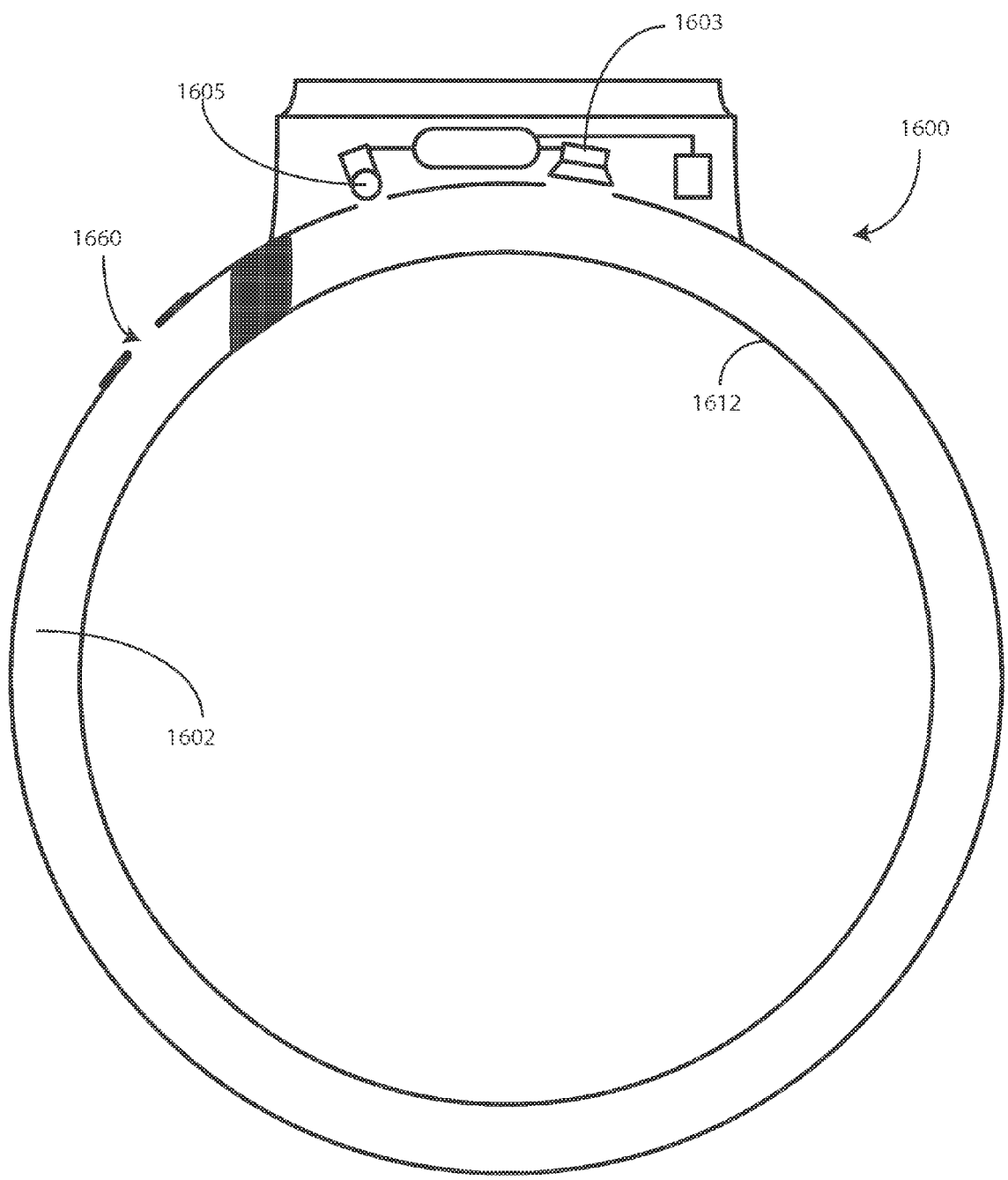
FIG. 16 illustrates another explanatory embodiment of a wearable device in use in accordance with one or more embodiments of the invention.

Turning now to FIG. 16, illustrated therein is an electronic device 1600 configured with an externally ported strap 1612. To this point, the straps described above have been sealed devices having ports only to the component portions. Accordingly, the air chambers disposed in those straps functioned largely like the chambers in closed loudspeaker enclosures. The externally ported strap 1612 has an external port 1660, which allows it to function more like a ported loudspeaker enclosure. When the driver 1603 excites the air chamber 1602 in the strap 1612, the air in the external port 1660 will allow air to flow into and out of the air chamber 1602. The size and/or shape of the port can then be adjusted as desired to complement the natural frequency of the air chamber 1602. Specific configurations of the external port 1660 can also be used to increase efficiency by allowing back waves from the driver 1603 to reinforce front waves for an increased acoustic signal for the frequency detector 1605.

In one or more embodiments, the addition of the external port 1660 can allow the driver 1603 to be omitted. By allowing external noise into the strap 1612 through the external port 1660, the external noise can serve as the acoustic stimulator, thus obviating the requirement to include a driver 1603 to excite the air chamber 1602.

Figure 17:
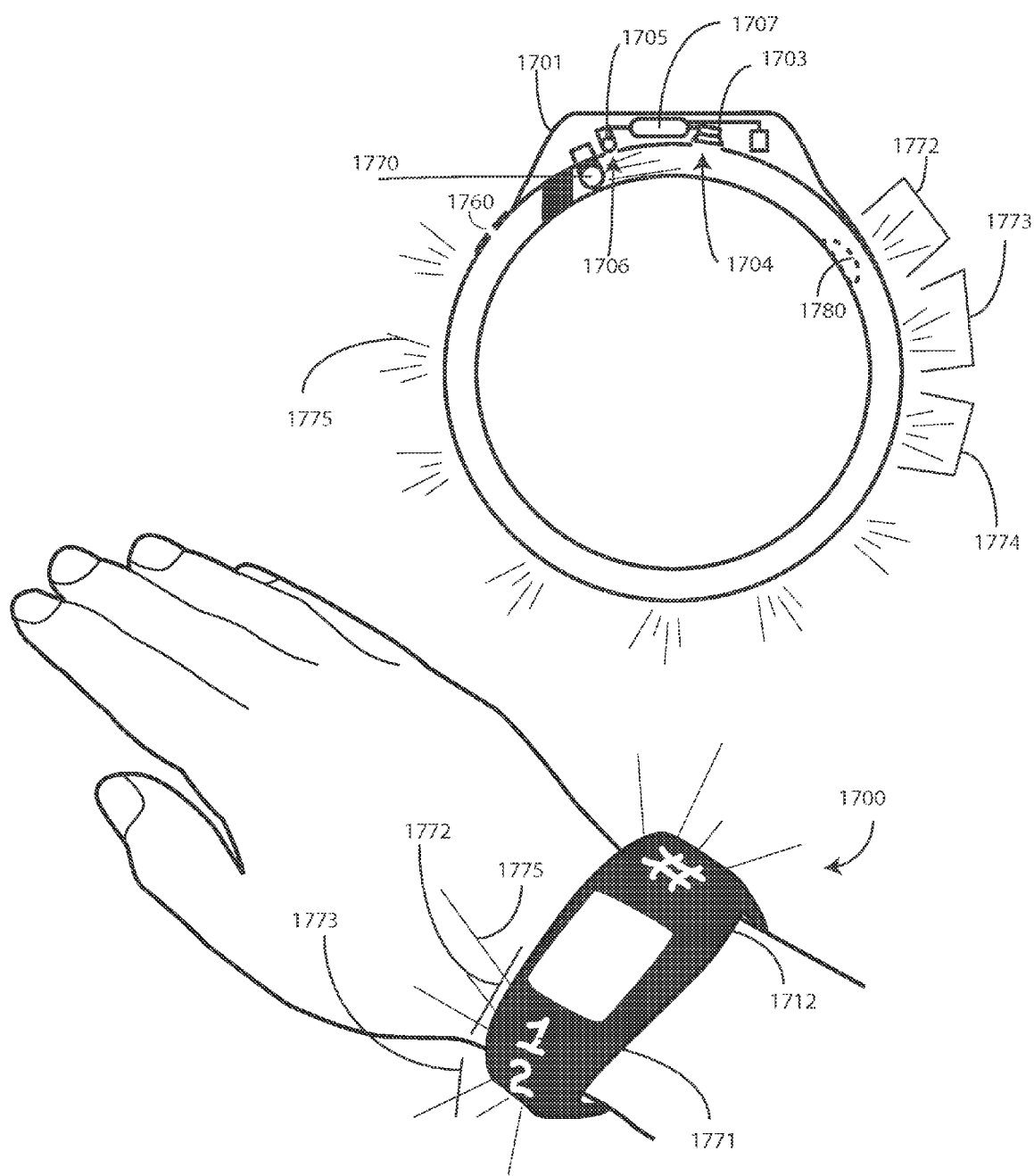
FIG. 17 illustrates another explanatory embodiment of a wearable device in use in accordance with one or more embodiments of the invention.

Turning now to FIG. 17, illustrated therein is yet another electronic device 1700 configured in accordance with one or more embodiments of the invention. As with many of the embodiments described above, the electronic device 1700 of FIG. 17 includes a driver 1703 disposed in the component portion 1701 at a first port 1704 defined between the component portion 1701 and the strap 1712, a frequency detector 1705 disposed in the component portion 1701 at a second port 1706 defined between the component portion 1701 and the strap 1712, and a control circuit 1707 that is operable with the driver 1703 and the frequency detector 1705. The control circuit 1707 is configured to determine a peak frequency over a frequency range in the air chamber 1702 of the strap 1712 with the frequency detector 1715 that are responsive to signals produced by the driver 1703, correlate the peak frequency of pressure variations determined with a user input, and perform an operation based upon the user input. In one embodiment, the operation comprises controlling an application that is operable with the control circuit 1707 as previously described.

In addition to these components, the electronic device 1700 of FIG. 17 further includes an illumination device 1770 operable with the control circuit 1707. The illumination device 1770 is configured to deliver light into the air chamber 1702 of the strap 1712. In one embodiment, the illumination device 1770 comprises a side-emitting light emitting diode, although other types of illumination devices will be obvious to those of ordinary skill in the art.

In the illustrative embodiment of FIG. 17, the strap 1712 comprises control indicia 1771 disposed thereon, with the control indicia 1771 indicating various indicia that indicate user compression regions 1772,1773,1774 correspond to user input options. In this illustrative embodiment, the control indicia 1771 define a keypad, and more particularly a telephone keypad, with each of the user compression regions 1772,1773,1774 comprising a key of the keypad. Illustrating by example, user compression region 1772 corresponds to a "1" key, while user compression region 1773 corresponds to a "2" key, and so forth.

The control indicia 1771 of this illustrative embodiment are formed from a pliant, pellucid material that allows light 1775 from the illumination device 1770 to pass through the sides of the straps within the indicia. Accordingly, the illumination device 1770 serves as a backlighting device that illuminates the control indicia 1771. The illumination device 1770 can be selectively activated. For example, the illumination device 1770 can be OFF until the user applies input to the strap 1712. Once the user input is detected, the control circuit 1707 can activate the illumination device 1770 to turn it ON. Alternatively, a light detector or other illumination control can be incorporated into the component portion 1701 to control the illumination device 1770 as well.

In one embodiment, the control indicia 1771 are configured as openings in the strap 1712. When an individual control indicium is depressed, the user's finger or other object pressing the strap 1712 seals the control indicia 1771 against an appropriate compression sealing feature. Illustrating by example, an optional compression sealing feature 1780 is shown to close the control indicia 1771 disposed along user compression region 1772. An optional external port 1760 can be included as well as described above. During a press, the driver 1703 can produce a wideband audio signal. An acoustic signal is allowed to escape through the uncovered control indicia producing a resonant acoustic system. The user of the device will hear a tone that differs based on the control indicium that is depressed. The furthest indicium from the driver 1703 will produce the longest cavity and thus the lowest note produced. The closest indicia to the driver 1704 when pressed will produce the highest note.

Figure 18:
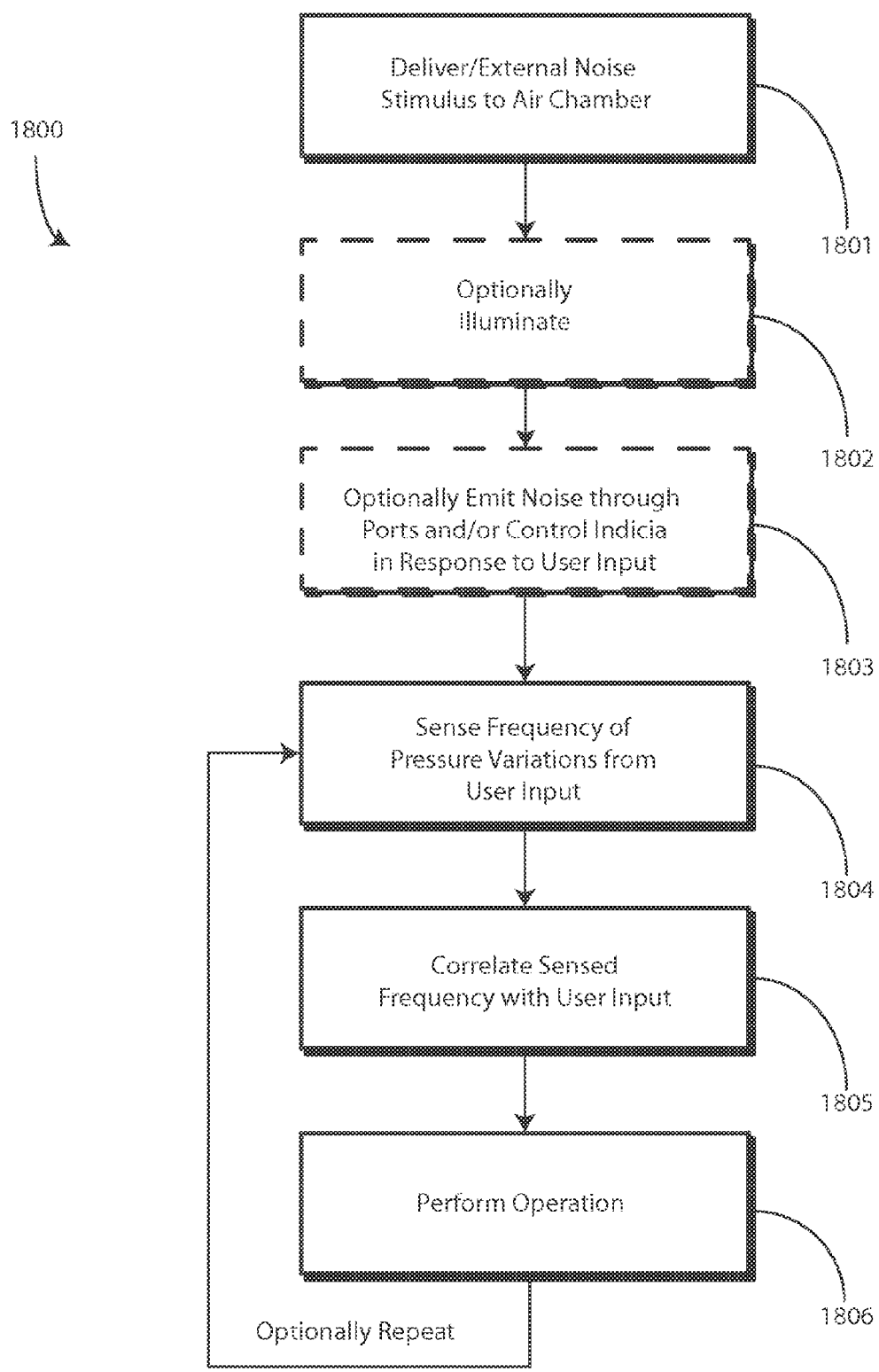
FIG. 18 illustrates one explanatory method of receiving a user input with a wearable device in accordance with one or more embodiments of the invention.

While the methods of delivering user input to, and receiving user input in, an electronic device have largely been described above, FIGS. 18 and 19 illustrate these method steps in flowchart form. Turning first to FIG. 18, illustrated therein is one explanatory method 1800 for receiving user input in an electronic device configured in accordance with one or more embodiments of the invention.

Beginning at step 1801, a driver, which may be a dynamic loudspeaker, piezoelectric transducer, external noise received through an external port, or other acoustic wave generating element, provides an acoustic signal to an air chamber defined within strap, dongle, or other enclosure of an electronic device. In one embodiment, the driver delivers the acoustic signal through a port defined between the housing in which the driver is disposed and the air chamber. The acoustic signal then causes the pressure variations to occur within the air chamber. At optional step 1802, an illumination device, such as a light strip or light emitting diode, can illuminate indicia disposed along the strap, dongle, or enclosure. At optional step 1803, an acoustic signal can be provided in response to user input occurring after step 1802 as described above with reference to FIG. 17.

At step 1804, a frequency detector, which in one embodiment is a microphone disposed at a second port defined between the housing in which the frequency detector is disposed and the air chamber, senses a frequency of pressure variations in an air chamber. These pressure variations can be a function of a volume of the air chamber, the frequency of the stimulus signal, and the shape and size of the first and second port, and where included an external port.

Since the strap, dongle, or enclosure is pliant in one embodiment, user input applied to the strap, dongle, or enclosure can change the volume, thereby affecting the peak frequency detected by the frequency sensor. Given this, at step 1805 a control circuit operable with the frequency detector correlates the frequency of pressure variations sensed with a predefined user input. At step 1806, the control circuit performs an operation in the electronic device responsive to the predefined user input. The operation can include launching an application operable with the control circuit, controlling an application operable with the control circuit, communicating with external devices, and so forth. Since user input can be delivered in series, the method 1800 can repeat with step 1804 occurring again, in which the frequency detector senses a changed frequency of pressure variations in response to a compression of the strap that alters the volume of the air chamber.

Figure 19:
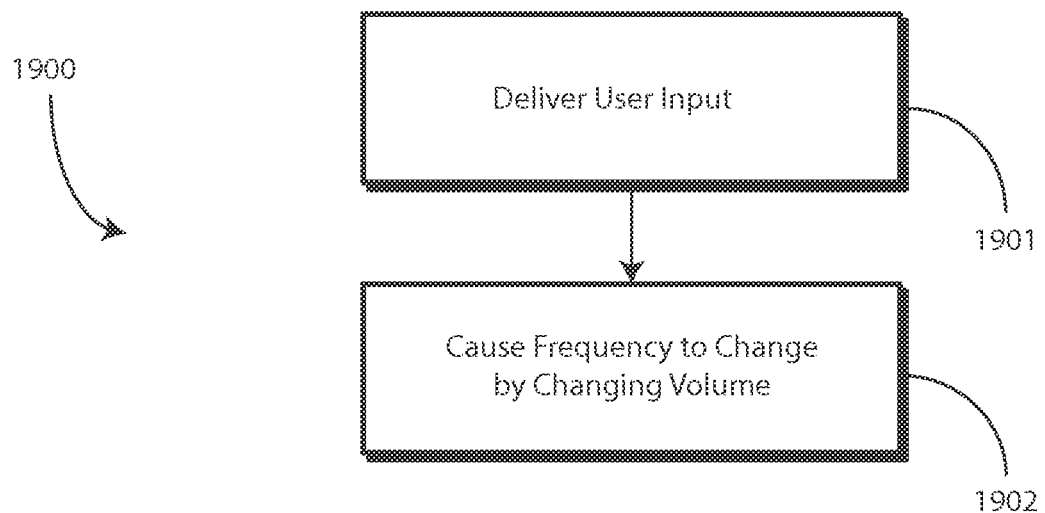
FIG. 19 illustrates one explanatory method of controlling a wearable device in accordance with one or more embodiments of the invention.

The user side of this process is shown in FIG. 19. Turning to FIG. 19 now, illustrated therein is a method 1900 of controlling an electronic device configured in accordance with one or more embodiments of the invention. At step 1901, the user delivers user input to a pliant strap, dongle, or enclosure of the electronic device. In one embodiment, step 1901 comprises applying pressure to the pliant strap, dongle, or enclosure, thereby compressing a portion of the pliant strap, dongle, or enclosure so as to alter a volume of an air chamber disposed therein. In another embodiment, step 1901 comprises stretching the pliant strap, dongle, or enclosure to alter the volume of the air chamber.

As shown at step 1902, the user input applied alters a frequency responsive to a driver disposed within the electronic device to change due to the fact that the frequency is at least partially a function of the volume. Changing the volume, in turn, alters the peak frequency. A control circuit can correlate this changed peak frequency as user input and perform operations based upon the same. Since user input can be delivered in series, the steps 1901,1902 of FIG. 19 can repeat as described above, with the user further compressing or stretching the pliant strap, dongle, or enclosure again to further alter the volume to provide a different input to the electronic device.

As described above, an electronic device, which may be configured as a wearable electronic device, includes a driver, a frequency detector, and an air chamber disposed within a pliant enclosure. The air chamber, in one embodiment, includes one or more ports through which the driver and frequency detector may access the air chamber. The strap can be manufactured from a pliant material such as silicone or rubber. In one or more embodiments, the strap contains no electrical traces, no electronic parts, and no flexible or printed circuit boards. The pliable nature of the strap allows it to deform easily such as stretching on the wrist or in response user finger presses, which constitute manual input. Embodiments of the invention provide an "electronics-free" hollow strap that can be used as an input device. The input device can be configured as a full-strap keypad, with selective strap buttons, such as volume up, volume down, image capture, play, or pause buttons, or as a strap stretching sensor that facilitates the actuation of wellness sensors such as heart rate monitors and the like.

As described, the deformable nature of the strap acts as a deformable cavity coupled to an acoustic feedback system defined by the driver and frequency detector. Deformations in the strap cause a change in the internal volume, which in turn causes a change in the resonance of the air chamber. The driver delivers a stimulus to the air cavity and the frequency detector measures the frequency of the acoustic change caused by the user input. The lack of electrical components in the strap offers advantages over prior art designs, including a simplification of strap construction, reduced cost, enhanced style, thin design, and increased water resistance.

Also, while the embodiments above use peak frequencies to detect changes in resonance or natural frequencies, it should be noted that detection of the resonances or natural frequencies can be achieved in other ways as well. For example, resonance or natural frequency can be identified by detecting a peak or dip in the amplitude of the frequency domain response of the signal acquired by the frequency detector. The resonance or natural frequency can also be identified by detecting a rapid phase shift or zero crossing in the phase response of the signal acquired by the frequency detector. Alternately, changes in the resonance of the air chamber can be identified via changes in the impedance of the driver. The resonance or natural frequency can also be detected by any known methods of resonant frequency detection without departing from the scope of this invention. It should be understood that these methods can be substituted for the peak detection described above. Regardless of method, in one or more embodiments, a control circuit disposed within the device can determine or estimate user input locations along the strap by detecting an amount of peak frequency shift. The control circuit can be configured to recognize user input press and release profiles as well.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:
1. An electronic device, comprising:
   a component portion;
   a hollow pliant structure defining an air chamber therein having a corresponding volume;

a driver disposed in the component portion at a first port between the component portion and the hollow pliant structure;

a frequency detector disposed in the component portion at a second port between the component portion and the hollow pliant structure; and a control circuit operable with the driver and the frequency detector and configured to:

determine a frequency of peak pressure variations in the air chamber with the frequency detector, frequency of peak pressure variations are a function of the corresponding volume and are responsive to signals produced by the driver;

correlate the frequency of peak pressure variations determined with a user input; and perform an operation based upon the user input;

wherein the frequency of peak pressure variations is proportional to a length of the air chamber defined by a distance through the air chamber from the driver and a point of compression of the hollow pliant structure.

2. The electronic device of claim 1, wherein the hollow pliant structure further comprises a strap.

3. The electronic device of claim 1, wherein the frequency of peak pressure variations is proportional to the corresponding volume.

4. The electronic device of claim 1, wherein the corresponding volume is configured to be alterable by one or more of stretching, compression, or translation of a pliant material of the hollow pliant structure.

5. The electronic device of claim 1, further comprising a mechanical protrusion proximately disposed in the air chamber with the first port and configured to increase an acoustic resistance of the first port when the hollow pliant structure is stretched.

6. The electronic device of claim 1, wherein the hollow pliant structure comprises control indicia disposed thereon that indicate user compression regions corresponding to user input options.

7. The electronic device of claim 6, further comprising an illumination device operable with the control circuit configured to illuminate the control indicia.

8. The electronic device of claim 6, wherein the control indicia defines a keypad.

9. The electronic device of claim 1, wherein the hollow pliant structure further comprises one or more compression sealing features disposed along a surface of the air chamber.

10. The electronic device of claim 1, wherein the hollow pliant structure further comprises one or more mechanical tactile feedback devices disposed along a surface of the air chamber.

11. The electronic device of claim 1, wherein the operation comprises controlling an application operable with the control circuit.

12. The electronic device of claim 1, wherein the air chamber comprises an externally ported chamber.

13. A method of receiving user input in a device having a component portion, comprising:

sensing, with a frequency detector disposed in the component portion at a first port between the component portion and the hollow pliant structure, a frequency of peak pressure variations in an air chamber of a hollow pliant structure of the device, the peak pressure variations from a driver disposed at a second port in the component portion, the frequency of peak pressure variations being a function of one of a volume of the air chamber;

correlating the frequency of peak pressure variations sensed with a predefined user input; and performing an operation in the device responsive to the predefined user input;

wherein the frequency of peak pressure variations is proportional to a length of the air chamber defined by a distance through the air chamber from the driver and a point of compression of the hollow pliant structure.

14. The method of claim 13, further comprising sensing a changed frequency of peak pressure variations in response to a compression of the hollow pliant structure that alters the volume of the air chamber.

15. The method of claim 13, further comprising providing an acoustic signal to the air chamber of the hollow pliant structure to provide a stimulus for the frequency of peak pressure variations.

16. The method of claim 13, further comprising illuminating the air chamber.

17. The method of claim 13, wherein the operation comprises controlling an application operating with a control circuit disposed within the device.

18. An electronic device, comprising:

a component portion;

a hollow pliant structure defining an air chamber therein having a corresponding volume;

a driver disposed in the component portion at a first port between the component portion and the hollow pliant structure;

a frequency detector disposed in the component portion at a second port between the component portion and the hollow pliant structure; and a control circuit operable with the driver and the frequency detector and configured to:

determine a frequency of peak pressure variations in the air chamber with the frequency detector that are a function of the corresponding volume and are responsive to signals produced by the driver;

correlate the frequency of peak pressure variations determined with a user input; and perform an operation based upon the user input;

wherein the hollow pliant structure comprises control indicia disposed thereon that indicate user compression regions corresponding to user input options.

19. The electronic device of claim 18, wherein the hollow pliant structure further comprises a strap.

* * * * *